United States Patent [19]

Castle

[11] 4,321,003
[45] Mar. 23, 1982

[54] LIFTING TOOL

[76] Inventor: Alfred B. Castle, 4104 Maryland Ave., Bethesda, Md. 20016

[21] Appl. No.: 131,690

[22] Filed: Mar. 19, 1980

[51] Int. Cl.³ .............................................. B62B 1/14
[52] U.S. Cl. ................................... 414/440; 414/444; 254/131
[58] Field of Search ..................... 414/684.3, 440, 442, 414/444; 254/131; 212/166; 280/47.24, 47.26, 47.21, 47.23

[56] References Cited

U.S. PATENT DOCUMENTS

| | | | |
|---|---|---|---|
| 458,182 | 8/1891 | Merrifield | 280/47.23 |
| 666,967 | 1/1901 | Marx et al. | 280/47.23 |
| 2,846,259 | 8/1958 | Sadler | 254/131 X |
| 3,275,299 | 9/1966 | Meshew | 254/131 |
| 3,856,166 | 12/1974 | Gibson | 414/444 |
| 4,206,848 | 6/1980 | Wiese et al. | 212/166 |

FOREIGN PATENT DOCUMENTS 505092 7/1920 France .............................. 280/47.24

Primary Examiner—Robert W. Saifer
Attorney, Agent, or Firm—Murray and Whisenhunt

[57] ABSTRACT

Tool for vertically lifting and maneuvering objects such as utility access covers. A pair of spaced-apart ring assemblies including inner and outer concentric independently rotatable rings are connected to each other by a connecting member which extends over the object. The object is engaged to the tool by hooks suspended from the connecting member. A lever is connected to the connecting member so that when a force is applied to the lever the connecting member rotates causing simultaneous rotation of the inner rings while the outer rings remain stationary to vertically lift the object into the space between the ring assemblies. The object while suspended between the ring assemblies is then transportable by rotation of the outer rings with respect to the inner rings.

10 Claims, 9 Drawing Figures

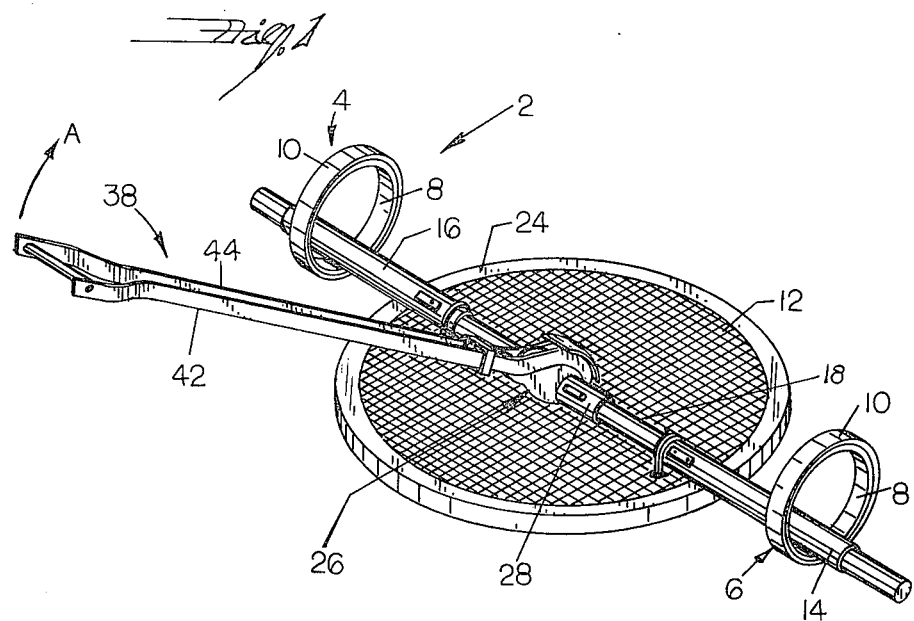
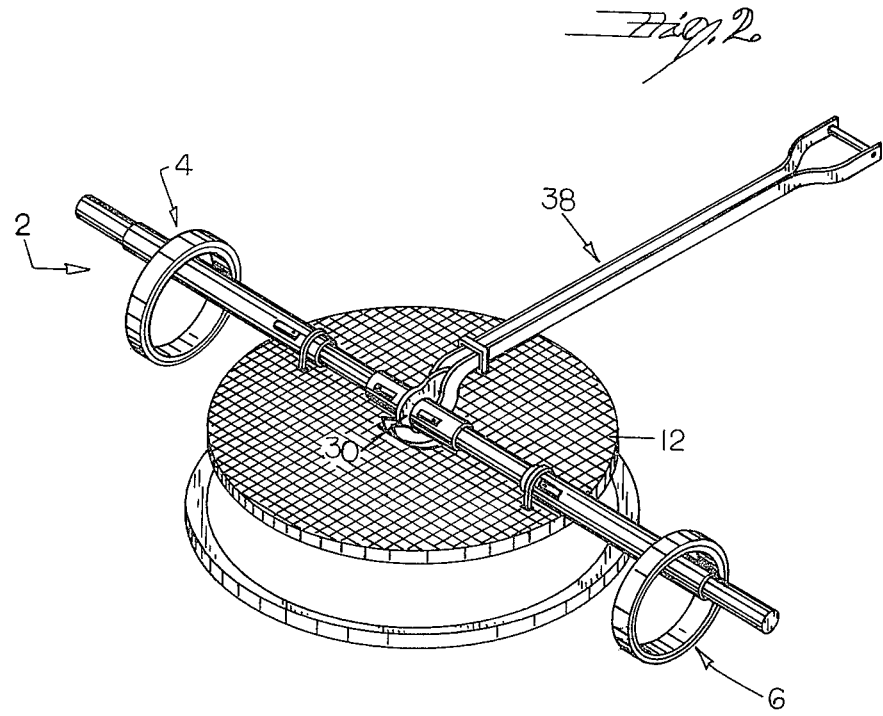

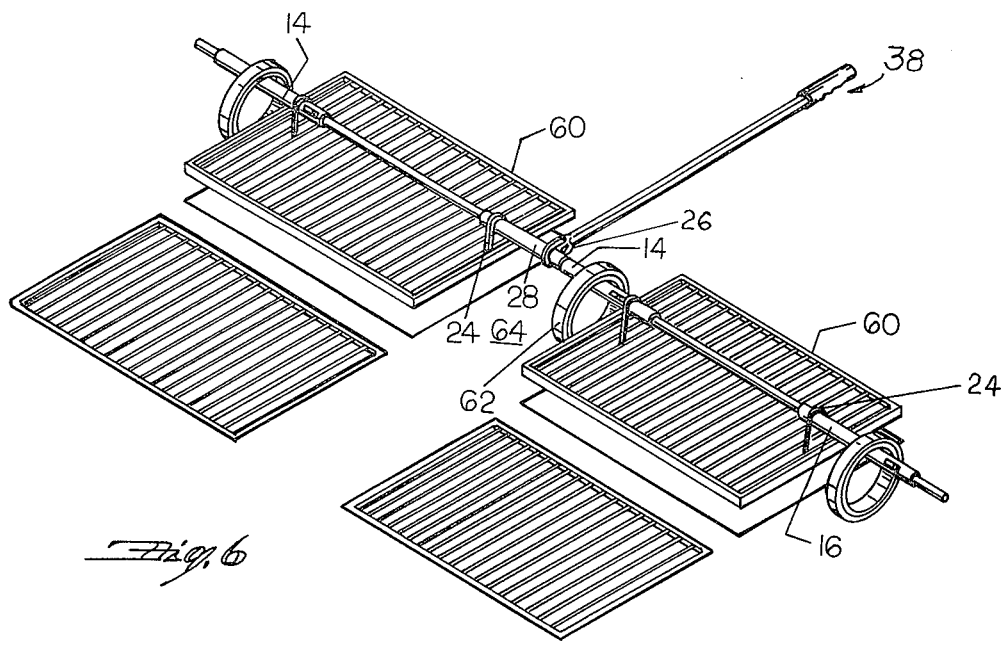
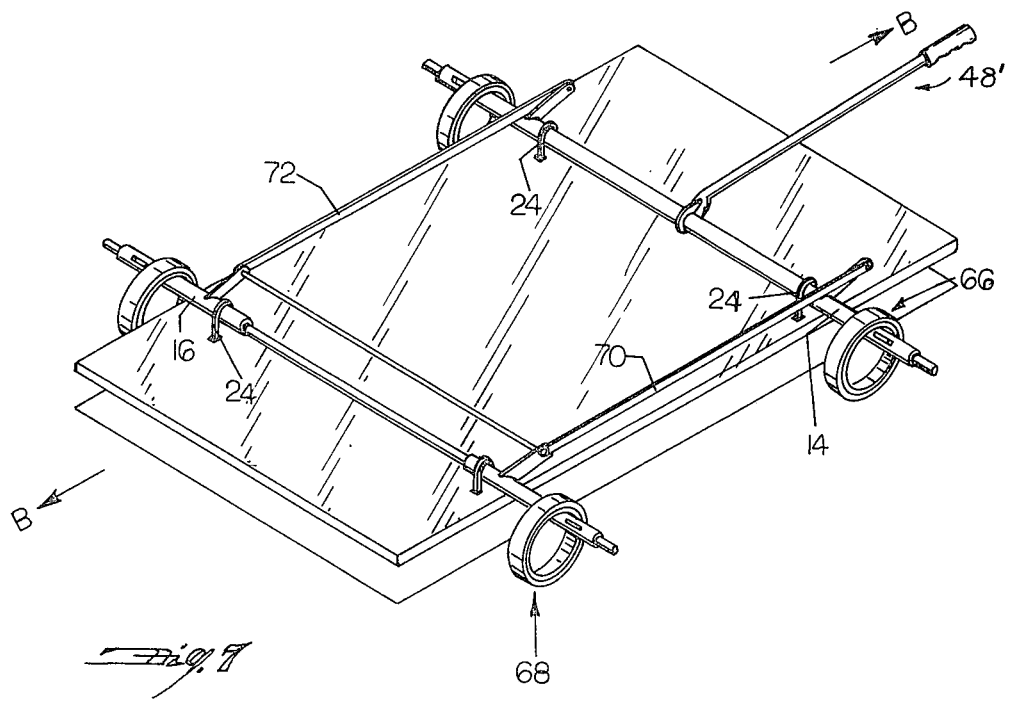

U.S. Patent  Mar. 23, 1982  Sheet 4 of 4  4,321,003
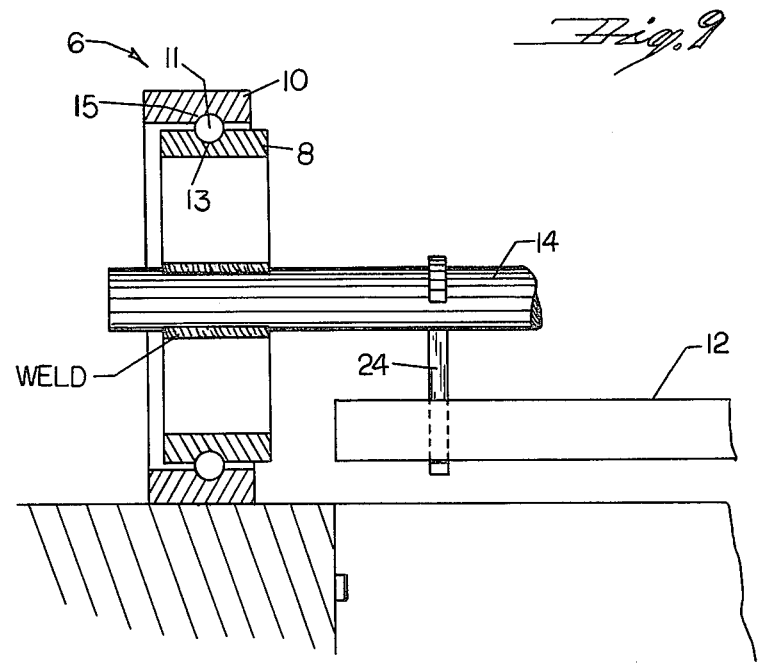
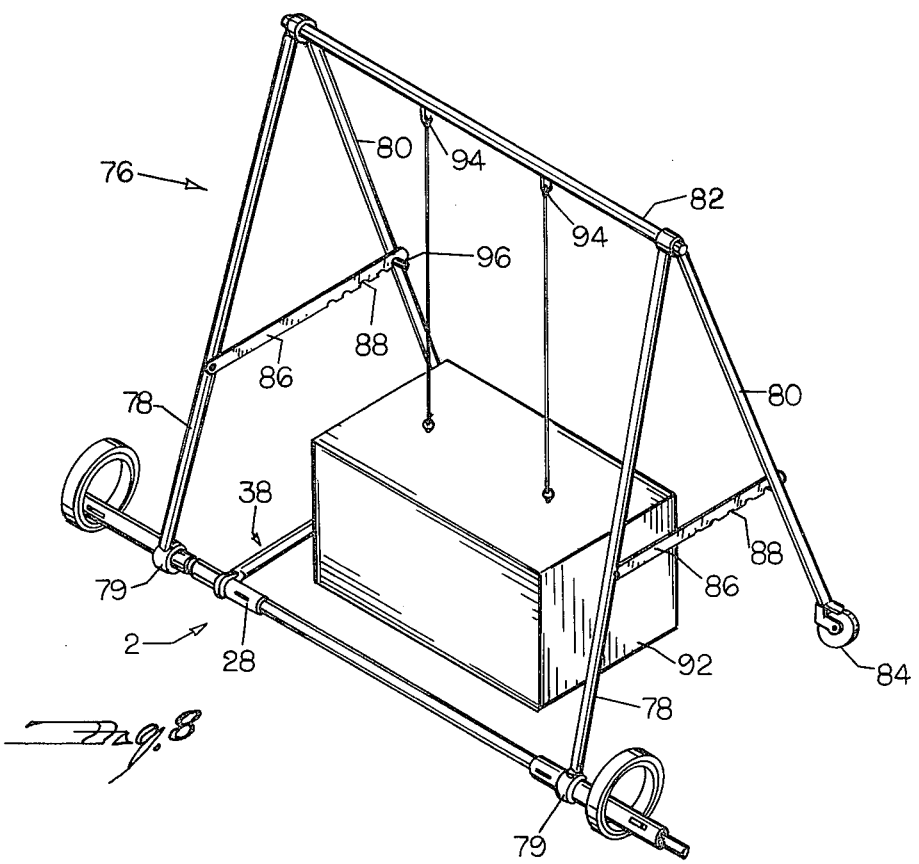

LIFTING TOOL

The present invention relates to a tool suitable for vertically lifting and maneuvering objects including, for example, manhole covers, gratings and other types of utility access cover.

BACKGROUND OF THE INVENTION

It is well known that many utility installations, for example sewer pipes, waste water pipes, electric cable conduits, mains water supply control valves, transformers, and the like, are positioned below ground level. Access to these utility installations is generally achieved by climbing through an entrance hole at ground level and down a vertically extending access conduit, usually a cylindrical pipe having a diameter large enough to permit at least a person to gain access to the utility installation.

The access conduit entrance is invariably provided with a utility access cover which is usually fabricated from a rigid robust material such as cast iron or reinforced concrete and, as a result, is heavy and difficult to maneuver. Most usually, these utility access covers are fabricated from cast iron and have at least two holes near the outer circumferential edge of the cover for use in removing the cover from the entrance hole. In position, the cover is seated in a cover support ring situated such that the cover and the ring are substantially in the plane of the surrounding surface, such as that of the road or sidewalk surface. The technique usually employed for lifting and maneuvering these covers is to use a crow-bar, trap-hook, or similar metallic rod-like took by inserting the tool into one of the holes in the cover and pulling the tool outwards and upwards towards the operator, relying on the friction between the cover and the tool to effect lifting of the cover. Alternatively, the cover may be removed by forcing it out of its support ring by jamming a tool between the outer peripheral edge of the cover and the support ring. In both instances, very little control over the movement of the cover can be maintained and, furthermore, there is always the chance that the cover may drop off the tool and injure the operator.

In the U.S. patent application Ser. No. 080,233 (now U.S. Pat. No. 4,227,731), to Alfred B. Castle, the inventor of the tool of the present application, there is disclosed a lifting tool which can be used to conveniently lift and maneuver utility access covers, especially heavy cast iron manhole covers, while maintaining complete control over the movement of the cover and without risk of the cover becoming disengaged from the tool and possibly injuring the operator. The tool described in the above-mentioned application Ser. No. 080,233, the disclosure of which is specifically incorporated herein by reference, is particularly suited for lifting and maneuvering utility access covers provided with locking devices such as that described in U.S. Pat. No. 3,751,949 to Alfred B. Castle.

While the lifting tool described in the above-mentioned Ser. No. 080,233 works well for regular-sized circular manhole covers and small gratings, difficulties are still encountered in lifting and maneuvering larger manhole covers and gratings, in particular those employed, for example, to cover large below-ground-level transformer housings. A major problem with these larger covers and gratings is that, in view of their increased dimensions and weight (typically in the range 300 to 2000 pounds, e.g., 450 to 700 pounds), it is generally necessary to employ two or more persons for the cover handling operation, which increases labor costs significantly. In addition, while it may be possible for two or more persons to lift the cover from its retaining frame without the expenditure of too much effort, moving the covers away from the frame requires care and can be dangerous, as it is necessary to walk near the edges of the frame. Loss of control of the cover in the region of the frame could result in severe damage to the utility installation if the cover falls into the installation vault as well as severe physical injury to the persons involved.

SUMMARY OF THE INVENTION

It has now been found that the above-mentioned problems associated with prior known tools for lifting and maneuvering utility access covers, especially large and heavy utility access covers, can be overcome by the tool of the present invention. As used herein, the expression "utility access cover" means any cover which is commonly employed to restrict access to utility installations, usually those located below ground. More particularly, this expression is intended to include circular "manhole" covers, having at least one hole located near an outer peripherial edge and extending through the top surface of the cover, gratings having parallel spaced-apart bars of rectangular cross-section and generally placed over transformer installations and the like, reinforced concrete utility covers, and any other type of cover designed to prevent entry to utility installations by unauthorized personnel.

It has also been found that the tool of this invention can be used to lift and maneuver many other diverse objects including, for example, box-shaped objects, automobile engines, luggage, carpet rolls, furniture, transformers, sewage pipes, and so and so forth.

It will be appreciated, therefore, that the tool of the present invention is not limited to lifting and maneuvering utility access covers, and that it can be readily adapted for use in handling other objects such as those just exemplified. Some specific examples of adaptions of the tool for purposes other than lifting utility access covers will be described later.

The lifting tool of this invention comprises a ring support means for supporting the tool during lifting and maneuvering of the object. The ring support means has at least two axially spaced-apart ring assemblies which are spaced apart by a distance sufficient to permit the object to be lifted and suspended between the ring assemblies. Each ring assembly includes an inner and outer concentric ring member, each independently rotatable with respect to the other, with the inner ring member being at least partially axially within the outer ring member. A connection means is mounted on the inner ring members for axially connecting together the spaced-apart ring assemblies, and object engaging means are mounted on the connecting means for liftingly engaging the tool with the object to be lifted. Lever means are operatively engaged to the connecting means so that when a force is applied to the lever means to rotate the connection means, the inner ring members are rotated simultaneously with respect to the outer ring members which remain substantially stationary. Upon simultaneous rotation of the inner ring members, the object is vertically lifted into a raised position between the ring assemblies as the connecting means and the engaging means move upwardly. With the object suspended in the raised position, the object is transportable by pulling or pushing the lever means to effect rotation of the outer ring members relative to the inner ring members. The object is lowered by moving the lever means in the opposite direction to that just described, whereby the inner ring members rotate in the opposite direction and permit lowering of the suspended object back to ground level or into a receiving frame.

From the above it will be seen that it is possible, using the tool of this invention, to maintain complete control of movement of the object as it is brought into the raised position between the ring assemblies and then transported by rotation of the outer rings. The object is securely retained on the engaging means so that there is no risk of the cover becoming disengaged from the tool and injuring the operator during lifting and maneuvering. Further advantageous features of the present tool are its maneuverability and superior mechanical advantage which further aid in the controlled and safe lifting and maneuvering of the object. Thus, as the length of the lever is increased, for example, by using a long pipe member, a greater mechanical moment is created making lifting and maneuvering of the cover a relatively effortless operation.

According to a preferred feature of the invention, which is described in more detail below, it is possible to employ the tool described and claimed in the above-mentioned U.S. patent application Ser. No. 080,233 as a handle which is connected to the lever means.

BRIEF DESCRIPTION OF THE DRAWINGS

Further features and advantages of the tool of the invention will become apparent upon consideration of the following detailed description of specific embodiments, especially when taken in conjunction with the accompanying drawings, wherein:

FIG. 1 is a perspective view of the tool of the invention in engagement with a utility access cover in its lowered position with the tool of U.S. patent application Ser. No. 080,233 engaged as a handle;

FIG. 2 is a perspective view of the tool shown in FIG. 1 with the utility access cover in the raised position;

FIG. 6 shows an alternative embodiment of the tool of the invention;

FIG. 7 shows a further alternative embodiment of the tool of the invention;

FIG. 8 shows yet a further alternative embodiment of the tool of the invention;

FIG. 9 is a partial cross-sectional front elevation showing one embodiment of the ring assembly in a partially raised position.

DETAILED DESCRIPTION OF THE INVENTION

Figure 3:
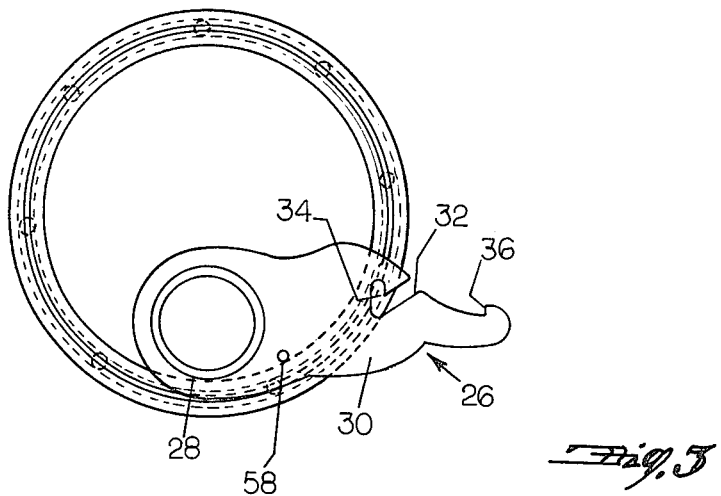
FIG. 3 is a partial side elevation showing one embodiment of a handle connecting plate.

For convenience, in the major portion of following description, reference will be made to utility access covers as the objects being lifted and maneuvered by the tool of the invention. However, as indicated earlier, the present tool is not limited to lifting and maneuvering utility access covers, and FIG. 8 which is discussed later shows an alternative arrangement for lifting objects other than utility access covers.

Referring initially to FIG. 1, there is shown the tool of the invention, generally referenced 2. The tool 2 is generally fabricated from metal, typically high strength steel, and comprises two axially spaced-apart ring assemblies 4,6 each including inner and outer concentric rings 8,10 which are independently rotatable with respect to each other. The inner rings 8 are at least partially axially aligned within the respective outer rings 10 and, as can be seen in FIG. 9, it is preferred for each inner ring 8 to be offset axially inwardly of the outer ring 10. This ensures that the cover 12, which in FIGS. 1, 2, and 9 is a regular manhole cover, does not rub against or otherwise come into contact with the outer rings and thereby impede their rotation when the cover is being transported. The rings 8,10 are independently rotatable by the provision of a plurality of ball bearings 11 which are equiradially mounted in troughs 13,15 formed in the inner and outer rings respectively (see FIG. 9).

An axially short pipe member 14,16 suitably of 1¼" diameter steel piping is firmly mounted on each inner ring 8, usually by welding (see FIG. 9). Although the position of each pipe member 14,16 on the respective ring assembly is not critical, the arrangement shown in FIG. 9 is preferred, with a major portion of the pipe member, for example about three quarters of its length, extending inwardly over the cover 12, and a small portion, for example about a quarter of the length, extending outwardly of the ring assembly 6. As described below, the cover 12 is engaged to the tool by hooks 24 which are mounted on the pipe members 14,16 and thus the provision of a greater portion extending over the cover allows for variations in the position of points on the cover with which to engage the tool.

A 1" diameter elongate steel pipe 18 is received as a sliding fit in each 1¼" pipe member 14,16 and relative rotation of the pipe 18 and the members 14,16 is prevented by biased locking pins 20 received through aligned holes in the pipe members 14,16 and the pipe 18. The pins 20 are mounted on spring steel strings which are screwed to the pipe members 14,16.

The tool is engaged with the cover by hooks 24 which are of suitable shape and length to be mounted on the pipe 18 or on the pipe members 14,16 and to extend through holes or between bars in the cover. To facilitate easy assembly of the tool over the cover, the hooks 24 are first engaged with the cover and then placed on the pipe members 14,16. This enables the elongate pipe 18 to be passed through the pipe members 14,16 followed by engagement of the locking pins 20 without disturbing the position and orientation of the hooks engaged with the cover.

Figure 4:
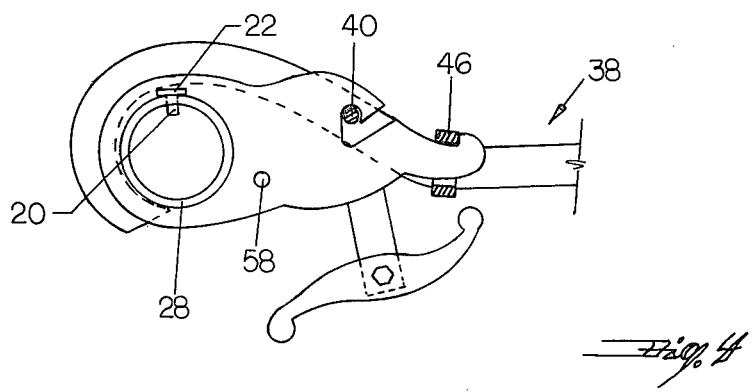
FIG. 4 is a partial view of a handle engaged with the handle connecting plate of FIG. 3.
Figure 5:
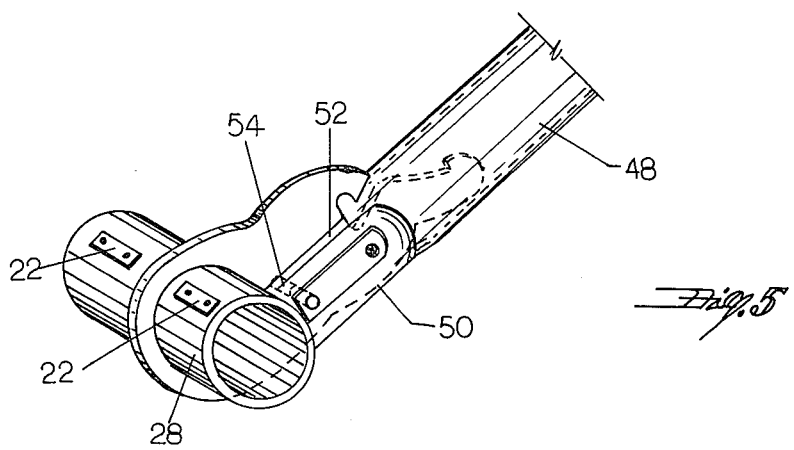
FIG. 5 is a perspective view of an alternative handle engaged with the handle connecting plate of FIG. 3.

Mounted on the pipe 18 is a lever means generally referenced 26. The lever means 26 includes an axially short pipe member 28 having mounted thereon a connecting plate 30 which is formed with a slot 32 containing a notch 34, and a terminal hook portion 36. The plate 30 is fixed relative to the pipe 18 by locking pins 20 similar to those described earlier. The plate 30 is particularly adapted for connection to tool 38 described and claimed in the above-mentioned U.S. patent application Ser. No. 080,233, and which is shown in FIG. 1 and also partially in FIG. 4. The tool 38 is connected to the plate 30 by engaging a transverse rod 40 extending between parallel elongate metal bars 42,44 along the slot 32 and into the notch 34, and bringing the hook 36 through the space between the elongate bars 42,44 so that it is engagable with a collar 46 slidably mounted on the bars 42,44. A partial view of the completed assembly is illustrated in FIG. 4. The hook and notch configuration 36,34 together with the collar 46 ensures that there is no possibility of the tool 38 becoming disengaged from the plate 30 at any point in the angular movement of the tool 38 when raising or lowering the cover In an alternative embodiment, it is possible to use, instead of the tool 38, a pipe handle 48 as shown in FIG. 5. In this arrangement, the pipe has a flattened end portion 50 having a receiving slot 52 and a locking pin arrangement 54 similar to pin 20 described earlier. The hook portion 36 of the plate 30 is received in the slot 52 and some way into the pipe, and the pin 54 is receivable in hole 58 in the plate 30 and through the end portion 50 to prevent the pipe becoming disengaged from the plate 30.

FIG. 6 of the drawings shows an alternative embodiment of the tool wherein three ring assemblies are employed for lifting simultaneously two (or more) gratings 60 arranged for example side by side and in a bank forming a large cover assembly. As will be seen in FIG. 6, the centrally disposed ring assembly 62 is supported on a support wall 64 which separates the individual banks of gratings. A lever means 26 similar to that described earlier is mounted adjacent to the centrally disposed ring assembly 62, and a tool 38 or a pipe handle 48 can be employed as the handle. The hooks 24 are mounted on the axially short pipe members 14,16, and the pipe member 28 of the lever means 26 can also be used to support a hook 24 as shown in FIG. 6. It will be appreciated that it is readily possible to quickly remove pairs of gratings 60 using one tool for each pair, thereby avoiding the necessity of repeatedly disengaging the tool from the grating and removing the next set. This procedure also enables the grating bank to be reassembled by simply bringing each tool with the respective engaged gratings back over the utility vault.

FIG. 7 shows a further alternative embodiment of the tool of the invention in which two pairs of ring assemblies 66,68 are operatively connected to each other by a link arrangement. This includes connecting rods 70,72 mounted on the axially short pipe members 14,16 so that movement of handle 48' connected to one pair of ring assemblies will cause simultaneous rotation of the inner rings of the other pair of ring assemblies resulting in equal lifting effect between the two pairs of ring assemblies. This embodiment has the advantage that the hooks 24 can be located at approximately each corner of the cover or grating without first establishing roughly where the center of gravity lies. However, a disadvantage of this embodiment is that steerability is significantly reduced in view of the extra pair of ring assemblies, and movement is limited essentially to the directions indicated by the arrows B.

As indicated earlier, the tool of the present invention is not limited to the lifting and maneuvering of utility access covers. FIG. 8 shows one possible arrangement whereby the tool of the invention can be used to lift and transport other objects safely and without much effort. In FIG. 8, the tool generally indicated at 2 is shown connected to a lifting frame 76 having an A-configuration. The lifting frame has spaced-apart side members 78,80 which are connected at their apex by a connecting beam 82. The tool 2 is rotatably mounted at the feet of side members 78 through collars 79, and casters 84 are mounted at the feet of side members 80. The angle between side members 78,80 is adjustable by an adjusting bar 86 provided with a series of notches 88 engagable with a pin 90 mounted on the side members 80. The object to be transported 92 is suspended from hooks 94 mounted on the connecting beam 82. Operation of the tool 2 results in elevation of the side members 78 which in turn lifts the object 92. The suspended object can then be transported by pulling or pushing the frame by handle 96, with the casters 84 assisting in steering the frame.

The extent to which the object is lifted by the tool will depend mainly on the diameter of the ring assemblies 4,6. It has been found that when a 10 inch outer ring and a 9 inch inner ring is employed, the vertical lift of the object is about 5 to 7 inches. For utility covers, this is generally sufficient to lift the cover clear of the retaining frame and permit withdrawal of the cover. From this, it will be appreciated that it is possible to employ rings of any desired size, depending on the extent of lift required.

From a safety viewpoint, it is important that the length of the handle connected to the connecting plate 30 be such that should the operator's grip of the handle be inadvertently released, the object will contact the ground before the handle irrespective of where the pipe 18 is in relation to top dead center of the ring assemblies. This ensures that the tool will not tend to roll away out of control which might happen if the handle hits the ground prior to the object, thereby preventing the object from contacting the ground.

From the above description, it will be apparent that the tool of the invention offers significant advantages over prior tools which are currently employed to lift and maneuver utility access covers, and objects in general. In particular, the tool of the invention ensures controlled, safe handling of the object during lifting and maneuvering, and also has superior maneuverability and mechanical advantage, whereby the lifting of heavy covers and gratings can be achieved without the expenditure of excessive effort on the part of the operator.

I claim:

1. A tool for vertically lifting and maneuvering objects, comprising:
    (a) ring support means for supporting said tool during lifting and maneuvering of an object, said ring support means having at least two axially spaced-apart ring assemblies defining an object receiving zone between said assemblies, each ring assembly including an inner and outer concentric ring member each independently rotatable with respect to the other, said inner ring member being at least partially axially within said outer ring member;
    (b) connecting means mounted on said inner ring members for axially connecting together said spaced-apart ring assemblies;
    (c) object engaging means mounted on said connecting means for liftingly engaging said tool and said object;
    (d) lever means operatively engaged to said connecting means for axially rotating said connecting means, said inner ring members being simultaneously rotatable with respect to said outer ring members upon rotation of said connecting means;
said ring assemblies, connecting means and engaging means cooperating to vertically lift said object into a raised position in said object receiving zone upon rotation of said inner ring members, said object being transportable in said raised position upon rotation of said outer ring members relative to said inner ring members.

2. A tool according to claim 1, wherein said inner and outer ring members each have an axially radially inner and outer planar cylindrical surface, said axially outer surface of said inner ring member and said axially inner surface of said outer ring member defining an axial space in which is provided a plurality of equiradially spaced rolling means for allowing independent rotation of said inner and outer ring members with respect to each other.

3. A tool according to claim 1, wherein said inner ring member is offset axially inwardly towards said object receiving zone to thereby prevent contact of said outer ring members by said object when in said raised position.

4. A tool according to claim 1, wherein said connecting means includes an axially short pipe member firmly mounted on each of said inner ring members, and a connecting member engagable with each of said axially short pipe members.

5. A tool according to claim 4, wherein said lever means includes a connecting plate mounted on an axially short pipe member engageable with said connecting member, whereby rotation of said connecting member by applying a force to said lever means causes simultaneous rotation of said inner ring members.

6. A tool according to claim 4 or 5, and further including spring bias pin members extending through said connecting member and said axially short pipe members to prevent relative rotation of said connecting member and said axially short pipe members.

7. A tool according to claim 5, wherein said connecting plate includes a slot and hook for connecting said lever means to a tool handle having connecting points engageable with said slot and hook, said connecting points including a transverse rod engageable with said slot and a collar engageable with said hook.

8. A tool according to claim 5, including a pipe handle connectable to said connecting plate, said handle having spring biased locking pin receivable in an aperture in said plate for preventing inadvertent disengagement of said handle from said plate.

9. A tool for vertically lifting and maneuvering utility access covers, comprising:
(a) ring support means for supporting said tool during lifting and maneuvering of a utility access cover, said ring support means having at least two axially spaced-apart ring assemblies defining a utility access cover receiving zone between said assemblies, each ring assembly including an inner and outer concentric ring member each independently rotatable with respect to the other, said inner ring member being at least partially axially within said outer ring member;
(b) connecting means mounted on said inner ring members for axially connecting together said spaced-apart ring assemblies;
(c) cover engaging means mounted on said connecting means for liftingly engaging said tool and said utility access cover;
(d) lever means operatively engaged to said connecting means for axially rotating said connecting means, said inner ring members being simultaneously rotatable with respect to said outer ring members upon rotation of said connecting means;
said ring assemblies, connecting means and engaging means cooperating to vertically lift said utility access cover into a raised position in said receiving zone upon rotation of said inner ring member, said utility access cover being transportable in said raised position upon rotation of said outer ring members relative to said inner ring members.

10. A tool for vertically lifting and maneuvering objects, comprising:
(a) ring support means for supporting said tool during lifting and maneuvering of an object, said ring support means having at least two axially spaced-apart ring assemblies, each ring assembly including an inner and outer concentric ring member each independently rotatable with respect to the other, said inner ring member being at least partially axially within said outer ring member;
(b) connecting means connected to said inner ring members for axially connecting together said spaced-apart ring assemblies;
(c) cover engaging means mounted on said connecting means for liftingly engaging said tool and said object, said cover engaging means including a frame having spaced-apart end members rotatably mounted on said connecting means, said object being liftingly engageable to said frame;
(d) lever means operatably engaged to said connecting means for axially rotating said connecting means, said inner ring members being simultaneously rotatably with respect to said outer ring members upon rotation of said connecting means;
said ring assemblies, connecting means and frame cooperating to vertically lift said object into a raised position suspended from said frame upon rotation of said inner ring members, said object being transportable in said raised suspended position upon rotation of said outer ring members relative to said inner ring members.

* * * * *